United States Patent
Hoyle et al.

(10) Patent No.: US 6,516,249 B1
(45) Date of Patent: Feb. 4, 2003

(54) FLUID CONTROL SYSTEM WITH AUTONOMOUSLY CONTROLLED PUMP

(75) Inventors: Scott Baxter Hoyle, Maple Shade, NJ (US); Michael Anthony McSweeney, Spotswood, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 306 days.

(21) Appl. No.: 09/654,732

(22) Filed: Sep. 5, 2000

(51) Int. Cl.[7] .................. G05B 11/01; G05B 9/02; G05B 7/00; F04B 49/00
(52) U.S. Cl. .................. 700/282; 700/21; 700/82; 417/286
(58) Field of Search .................. 700/21, 82, 282, 700/301; 417/6.43, 286, 290, 426; 137/565.15, 565.33

(56) References Cited

U.S. PATENT DOCUMENTS

| | | | | | |
|---|---|---|---|---|---|
| 4,805,118 A | * | 2/1989 | Rishel | .................. | 340/606 |
| 4,916,628 A | * | 4/1990 | Kugler | .................. | 307/11 |
| 5,237,310 A | * | 8/1993 | Smith | .................. | 340/605 |
| 5,375,650 A | * | 12/1994 | Mizuno | .................. | 165/104.33 |
| 5,449,274 A | * | 9/1995 | Kochan, Jr. | .................. | 417/12 |
| 5,522,707 A | * | 6/1996 | Potter | .................. | 417/4 |
| 5,566,709 A | * | 10/1996 | Fujii et al. | .................. | 137/487.5 |
| 5,583,790 A | * | 12/1996 | Lan et al. | .................. | 700/282 |
| 5,742,500 A | * | 4/1998 | Irvin | .................. | 417/2 |
| 5,967,761 A | * | 10/1999 | Mehaffey | .................. | 417/286 |
| 6,045,332 A | * | 4/2000 | Lee et al. | .................. | 137/565.16 |
| 6,102,665 A | * | 8/2000 | Centers et al. | .................. | 417/17 |
| 6,254,353 B1 | * | 7/2001 | Polo et al. | .................. | 318/280 |
| 6,341,947 B1 | * | 1/2002 | Otomo | .................. | 303/11 |
| 6,363,707 B2 | * | 4/2002 | Junquera | .................. | 60/39.08 |

* cited by examiner

*Primary Examiner*—Leo Picard
*Assistant Examiner*—Elliot Frank
(74) *Attorney, Agent, or Firm*—Duane Morris LLP

(57) ABSTRACT

A plurality of autonomously controlled valves and pumps in a fluid distribution system are interconnected by a data communication network. The system also includes fluid flow sensors which report to the system by way of the network. The autonomous controllers include information as to their neighbors or environment sufficient to determine malfunctions such as a leak or break in an associated path, or flow-related problems, and can take autonomous action. The actions are established by the autonomous controllers regardless of the existence of a connection to the network, so that even if the network connection fails or is damaged, the valve or pump can still respond with predetermined "intelligent" actions.

10 Claims, 10 Drawing Sheets

FLUID CONTROL SYSTEM WITH AUTONOMOUSLY CONTROLLED PUMP

FIELD OF THE INVENTION

This invention relates to distributed control of fluid flow paths in contexts in which the flow paths, the equipments coupled to the flow paths, or both may fail or be damaged, and more particularly relates to autonomously controlled pumps for such systems.

BACKGROUND OF THE INVENTION

Seagoing vessels, regardless of whether they are intended for sport, commerce, or warfare, share in common the need to maintain their buoyancy and control in the face of potentially violent conditions including storms, grounding, and or hostile action. Maintaining control and buoyancy in the face of damage due to such violent conditions may require rapid amelioration of, or adaptation to, such damage. In a large ship, there may be many compartments, the entrances to which are separated by a sufficient distance from each other so that considerable time may be required for movement from one compartment to another. The existence of such compartments has in the past given rise to the need for an observer assigned to each compartment or set of compartments to monitor conditions. It might be thought that speaker tubes or telephones would be suitable for communicating between each of the various compartments and a control center or bridge, but there is a real possibility that damage to a compartment might also damage the communications equipment. Consequently, warships assign crew members to be messengers, whose duty is to carry information from the compartments to the control center or bridge in the event of a break in the communications. Damage to one compartment of a ship may require adjustments in many compartments, as for example when flooding of a compartment requires redistribution of the ship's load or supplies to prevent excessive list. The adjustments may include operation of valves and switches within the compartments, as might be required, for example, to start pumps and open valves for the dumping overboard of bilge water, or for redistributing liquid fuel from tanks on one side of the ship to tanks on the other side. Because time is very important when attempting to cope with damage, warships have in the past stationed crews at various locations about the ship. These crews are charged with the duties of operating valves and switches as commanded or trained. In addition to such adjustments, additional crews must be provided to be on standby for firefighting, for damage repair, and for tending the injured. In the case of a warship, a portion of the crew must additionally be used for manning weapons and countermeasure. Since the tending of injured presupposes that some of the crew is not capable of performing its duties, the crew must, even when reduced in number by casualties, be large enough to be able to perform all of the tasks associated with tending a ship in distress. All of these considerations result in the manning of ships with crews large enough to provide "surge" capability for the handling of any emergency. A large battleship of WWII vintage had a crew in excess of 3000 men, and an aircraft carrier in the vicinity of 5000. Even modern missile destroyers require crews exceeding 300 persons.

The presence of such large crews inevitably has its effects on ship design. It will be clear that the housekeeping and support requirements tend to expand disproportionately as the crew grows larger. The ship itself must be large in order to hold the oversize crew, and must carry additional stores such as food, which makes it larger still. Food preparation areas must be larger with a large crew, and the additional food preparation personnel in turn require their own support staff and ship facilities. The cost of ships is adversely affected by the need for a crew of a size to provide surge capability, and the cost of operating such ships is directly increased by the supernumerary members of the crew. The operating cost is further increased by the need to maintain the supernumerary members. It is thus of great importance in ship design to take into account the staffing requirements of the ship, and to improve ship design in such a manner as to minimize the crew size.

SUMMARY OF THE INVENTION

A part of the invention is based, in part, on the realization that automation can fulfill some of the tasks now performed by supernumerary crew members.

A fluid flow system according to an aspect of the invention tends to cause a flow of fluid through at least one fluid affecting device, which may be a heat exchanger which transfers heat to or from a fluid such as water, or which performs some other act on the fluid. The fluid flow is induced by a set including a plurality of pumps, not all of which need be energized at a given time, and any one of which may fail. The system includes at least one fluid affecting device including a first port and a second port, which are connected by a path for the flow of the fluid between the first and second ports. The system also includes a controllable first pump which, when energized, produces pressurized fluid at a pressure port, and which, when not energized, at least tends to impede the flow into the pressure port of the first pump as a result of application of pressurized fluid to the pressure port of the first pump. In the case of positive-displacement pumps such as Roots-type pumps, the inherent design prevents retrograde fluid flow, and in the case of other pumps, such as centrifugal pumps, the pump may be associated with a check valve to prevent reverse flow. The system also includes a controllable second pump which, when energized, produces pressurized fluid at a pressure port, and which, when not energized, at least tends to impede the flow of fluid into the pressure port of the second pump as a result of application of pressurized fluid to the pressure port of the second pump. A sensing arrangement or means is coupled to the fluid affecting device for generating a sensed signal representing a control parameter associated with one of flow of the fluid and pressure of the fluid; this may be, for example, a flow meter coupled for sensing the flow of fluid through the fluid affecting device, or a pressure sensor coupled to the high-pressure side of the fluid affecting device, or even to the low-pressure side for some applications. A communication network interconnects the sensing means and the first and second pumps for providing a path for the flow of information relating to the sensed signal and of at least the state of the first and second pumps. An independent first software program is associated with the first pump. The first software program is preloaded with information about the second pump and the fluid affecting device, for receiving information including the sensed signal and the state of the second pump, and for transmitting over the communication network signals representing the state of the first pump. Similarly, an independent second software program is associated with the second pump. The second software program is preloaded with information about the first pump and the fluid affecting device, and is arranged for receiving information including the sensed signal and information including the state of the first pump, and for transmitting over the communication network signals representing the state of the second pump. Each of the first and second independent software programs controls its associated pumps so that (a) if the sensed parameter is such as to require fluid flow, a determination is made if the one of the first and second pumps with which it is not associated is pumping, and (b) for energizing the associated one of the first and second pumps if the sensed parameter is such as to require fluid flow and the one of the pumps with which it is not associated is not pumping.

In a particular embodiment of the invention, at least one of the independent programs is preloaded with information identifying one of the first and second pumps as a preferred or default pump.

DESCRIPTION OF THE INVENTION

Figure 1:
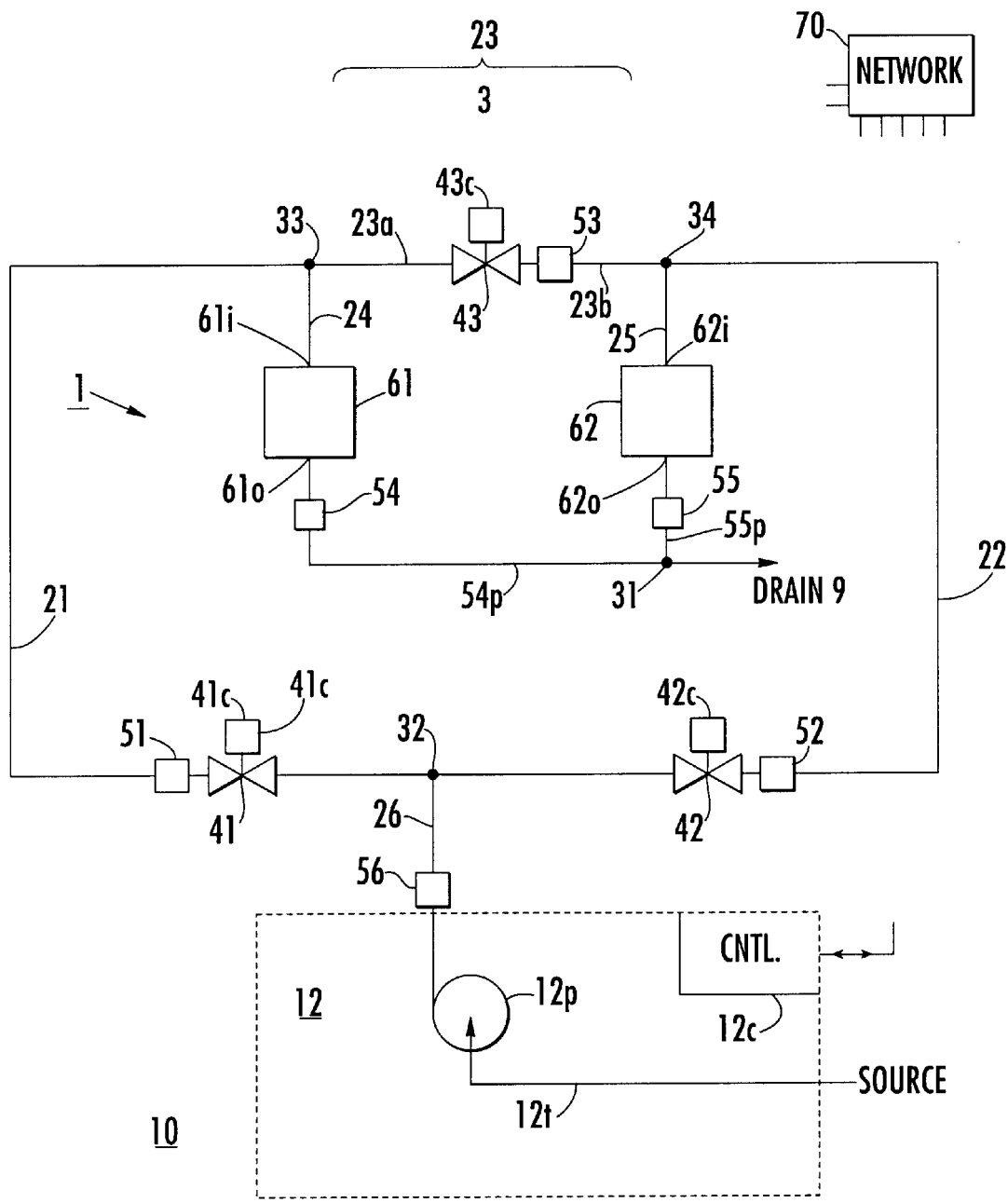
FIG. 1 is a simplified block diagram of a fluid flow or distribution system for distributing fluid from a source to one or both of a pair of flow utilization devices, substantially as described in U.S. patent application 09/608,829, filed Jun. 30, 2000.

In FIG. 1, a flow system 10 includes a source 12 of pressurized fluid, such as water. As illustrated, source 12 may include a pump 12$p$ coupled by a tube 12$t$ to a source of water, which may be a tube extending through the hull of a ship so as to allow pump 12$p$ to draw salt water from the ocean. Pump 12$p$ is controlled by a controller 12$c$ as described below. Pump 12$p$ provides pressurized fluid through a fluid flow sensor 56 to a pipe tee or bifurcation 32, which provides pressurized fluid to a flow path or pipe 21 by way of a software-controlled valve 41 and a flow sensor 51. Software-controlled valve 41 is controlled by an independent program associated with a valve controller 41$c$. Bifurcation 32 also provides pressurized fluid to a second flow path 22 by way of a software-controlled valve 42 and a flow sensor 52. Software-controlled valve 42 is controlled by an independent program associated with a valve controller 42$c$.

When valve 41 is open (allows flow of fluid) and pump 12$p$ is in operation, pressurized fluid is coupled to a tee junction or bifurcation 33, and fluid flows through one of a set 1 of two heat exchangers, and more particularly from heat exchanger input port 61$i$ through a heat exchanger 61 to a heat exchanger output port 61$o$, through a flow sensor 54 to a further tee junction or bifurcation 31, and to a drain designated 9. It should be noted that this description assumes the presence of a fluid path from the input port of the heat exchanger to the output port, and this path is not explicitly illustrated. When valve 42 is open and pump 12$p$ is in operation, pressurized fluid is coupled to a tee junction or bifurcation 34, and as a result fluid flows from an input port 62$i$, through a heat exchanger 62 to an output port 62$o$, through a flow sensor 55, to a tee junction or bifurcation 31, and to drain 9.

While the flow meters of FIG. 1 are illustrated as being separate from the controllable valves, they may be physically integrated into the same device or housing, and use common power supplies, logic hardware, and network connections.

The controllable valves 41, 42, and 43 of FIG. 1 may be located in a ship and connected for the flow of fluid in a manner described in more detail in U.S. patent application Ser. No. 09/571,346 filed on May 16, 2000 in the name of Hoyle et al. The controllable valves may be of any kind, but are preferably the type described in U.S. patent application Ser. No. 09/375,695 filed on Aug. 17, 1999 in the name of Hoyle et al. The flow sensors may be of any kind, but are preferably the unidirectional-flow-sensing type described in U.S. patent application Ser. No. 09/349,576 filed on Jul. 8, 1999 in the name of Hoyle et al., or of the bidirectional type described in U.S. patent application Ser. No. 09/487,848 filed Jan. 19, 2000 in the name of Hoyle et al.

The arrangement 10 of FIG. 1 also includes a further flow path 23 coupled between tee junctions 33 and 34. Flow path 23 includes flow paths 23$a$ and 23$b$, a flow sensor 53, and also includes a software-controlled valve 43 controlled by a controller 43$c$.

In FIG. 1, a communication network, illustrated as a block 70, couples valve controllers 41$c$, 42$c$, and 43$c$ with flow sensors 51, 52, 53, 54, 55, and 56, and with pump controller (CNTL) 12$c$. Each valve controller 41$c$, 42$c$, and 43$c$ is associated with, or contains, an independent logic system, which may be in the form of dedicated hardware, or preferably software, which acts, in conjunction with the communication network 70, as a distributed control system for controlling the fluid flow system 10 under a variety of conditions. The advantage of a distributed control system is that it is robust, with any undamaged subportion of the system 10 continuing to operate properly notwithstanding damage to, or failure of, other portions of the system 10. Thus, undamaged portions of the distributed control system continue to function notwithstanding damage to a portion of the overall control system, much as the uninjured members of a crew can continue to perform their duties notwithstanding incapacity of some crew members.

Figure 2:
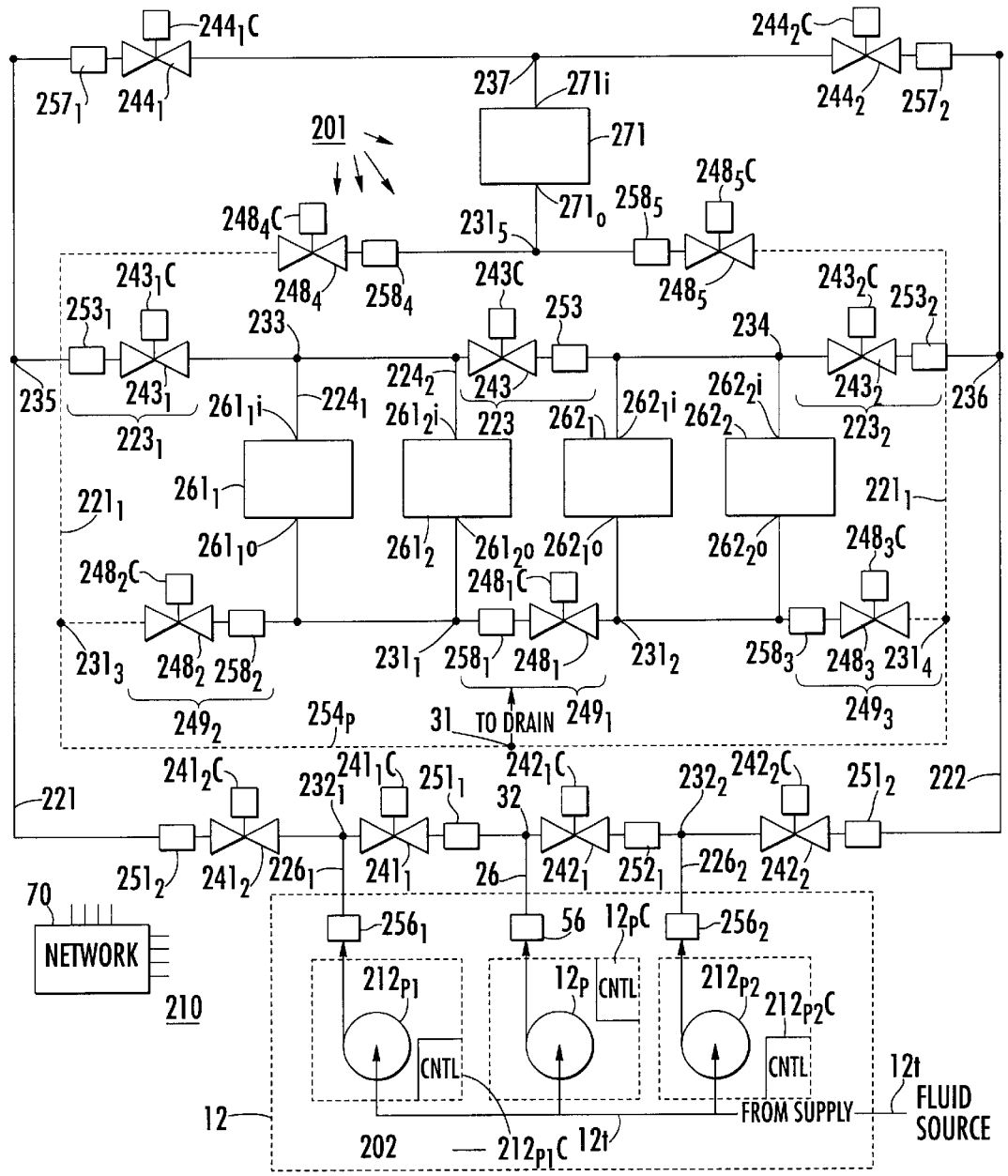
FIG. 2 is a simplified block diagram of a fluid flow or distribution system for distributing fluid from a plurality of sources to a plurality of flow utilization devices, also substantially as described in the abovementioned patent application.

FIG. 2 is a simplified block diagram of a fluid distribution system 210 more complex than, but generally similar in effect, to the arrangement 10 of FIG. 1. In FIG. 2, source 12 of pressurized fluid includes a fluid supply tube 12$t$ which supplies fluid to a set 202 of three pumps 12$p$, 212$p_1$, and 212$p_2$, which are controlled by controllers 12$pc$, 212$p_1 c$, and 212$p_2 c$, respectively. When in operation, each pump 12$p$, 212$p_1$, and 212$p_2$ produces pressurized fluid at an associated tee junction or bifurcation 32, 232$_1$, and 232$_2$. A flow sensor 56 measures the fluid flow through pump $12p$, a flow sensor $256_1$ measures the fluid flow through pump $212p_1$, and a flow sensor $256_2$ measures the fluid flow through pump $212p_2$. A software-controlled valve $241_1$ with a controller $241_1c$ is serially coupled with a flow sensor $251_1$ to provide a path for the flow of fluid between tees or bifurcations 32 and $232_1$. Similarly, a software-controlled valve $241_2$ with a controller $241_2c$ is serially coupled with a flow sensor $251_2$ to provide a path for the flow of fluid between tee or bifurcation $232_1$ and flow path 221. A software-controlled valve $242_1$ with a controller $242_1c$ is serially coupled with a flow sensor $252_1$ to provide a path for the flow of fluid between tees or bifurcations 32 and $232_2$. A software-controlled valve $242_2$ with a controller $242_2c$ is serially coupled with a flow sensor $251_2$ to provide a path for the flow of fluid between tee or bifurcation $232_2$ and fluid path or pipe 222. Thus, triply-redundant pumps $12p$, $212p_1$, and $212p_2$, when energized, provide pressurized fluid to tees or bifurcations 32, $232_1$, andor $232_2$, and, depending upon the states of the valves, the pressurized fluid may be supplied to path 221, 222, or both 221 and 222.

The arrangement of FIG. 2 includes a set 201 including a plurality equal to five of heat exchangers, described below. In FIG. 2, a pair of heat exchangers $261_1$ and $261_2$ are operated in parallel by having their input ports $261_1i$ and $261_2i$ coupled to tee or bifurcation 233 by way of fluid flow paths $224_1$ and $224_2$, respectively, and by having their output ports $261_1o$ and $261_2o$ coupled to tee or bifurcation $231_1$. Similarly, a pair of heat exchangers $262_1$ and $262_2$ are operated in parallel by having their input ports $262_1i$ and $262_2i$, respectively, coupled to tee or bifurcation 234, and by having their output ports $262_1o$ and $262_2o$, respectively, coupled to tee or bifurcation $231_2$. Heat exchanger sets $261_1$, $261_2$ and $262_1$, $262_2$ are connected to fluid source pipes 221 and 222 by means of software-controlled valves: a software-controlled valve 243, which is controlled by a controller $243c$, is serially coupled with a flow sensor 253 in a path 223 extending from tee or bifurcation 233 to tee or bifurcation 234, a software-controlled valve $243_1$, which is controlled by a controller $243_1c$, is serially coupled with a flow sensor $253_1$ in a path $223_1$ extending from tee or bifurcation 233 to tee or bifurcation 235, and a software-controlled valve $243_2$, which is controlled by a controller $243_2c$, is serially coupled with a flow sensor $253_2$ in a path $223_2$ extending from tee or bifurcation 234 to tee or bifurcation 236. Heat exchanger sets $261_1$, $261_2$ and $262_1$, $262_2$ are connected to fluid drain pipes $221_1$ and $222_1$ by means of software-controlled valves: a software-controlled valve $248_1$, which is controlled by a controller $248_1c$, is serially coupled with a flow sensor $258_1$ in a path $249_1$ extending from tee or bifurcation $231_1$ to tee or bifurcation $231_2$, a software-controlled valve $248_2$, which is controlled by a controller $248_2c$, is serially coupled with a flow sensor $258_2$ in a path $249_2$ extending from tee or bifurcation $231_1$ to tee or bifurcation $231_3$, and a software-controlled valve $248_3$, which is controlled by a controller $248_3c$, is serially coupled with a flow sensor $258_3$ in a path $249_3$ extending from tee or bifurcation $231_2$ to tee or bifurcation $231_4$.

Also in FIG. 2, a further heat exchanger 271 has a (nominally input) port $271i$ connected for the flow of fluid to a tee or bifurcation 237, and also has a (nominally output) port $271o$ connected to a tee or bifurcation $231_5$. Bifurcation 237 is coupled to source fluid paths 221 and 222 by way of software-controlled valves $244_1$ (controlled by controller $244_1c$) and $244_2$ (controlled by controller $244_2c$). Valves $244_1$ and $244_2$ are serially coupled with flow sensors $257_1$ and $257_2$, respectively. Heat exchanger 271 has its (nominally) output port $271o$ and tee or bifurcation $231_1$ coupled to source drain paths $221_1$ and $222_1$ by way of software-controlled valves $248_4$ (controlled by controller $248_4c$) and $248_5$ (controlled by controller $248_5c$). Valves $248_4$ and $248_5$ are serially coupled with flow sensors $258_4$ and $258_5$, respectively.

In operation of the arrangement of FIG. 2, either or both of fluid source paths 221 or 222 can be pressurized by operation of any one of the pumps $12p$, $212p_1$, andor $212p_2$, by operating valves $241_1$, $241_2$, $242_1$, and $242_2$ to an appropriate position. For example, pump $12p$ can pressurize path 221 by opening valves $241_1$ and $241_2$, while path 222 can additionally be pressurized by opening valves $242_1$ and $242_2$. If, on the other hand, only pump $212p_1$ is energized, path 221 can be pressurized by opening only valve $241_2$, while path 222 can additionally be pressurized by opening valves $241_1$, $242_1$ and $242_2$. With source pipes 221 and 222 pressurized by operation of pump $212p_1$, pipe 221 can be "depressurized" by closing valve $241_2$, assuming that no other path provides pressurization. Other combinations of open (flow allowed) and closed (flow prevented) conditions of various ones of valves $241_1$, $241_2$, $242_1$, and $242_2$ allow any or all of the pumps $12p$, $212p_1$, andor $212p_2$ to pressurize either or both of paths 221 and 222.

Bifurcation 235 of FIG. 2 allows fluid pressure in path 221 to be communicated to valves $243_1$ and $244_1$, while bifurcation 236 allows fluid pressure in path 222 to be communicated to valves $243_2$ and $244_2$. Opening any one of these valves allows fluid under pressure to be applied to the input port of at least one of the heat exchangers. More particularly, if path 221 is pressurized, opening valve $243_1$ allows pressurized fluid to reach the input ports $261_1i$ and $261_2i$ of heat exchanger set $261_1$ and $261_2$, and opening valve $244_1$ allows pressurized fluid to reach the input port $271i$ of heat exchanger 271. If path 222 is pressurized, opening valve $243_2$ allows pressurized fluid to reach the input ports $262_1i$ and $262_2i$ of heat exchanger set $262_1$ and $262_2$, and opening valve $244_2$ allows pressurized fluid to reach the input port $271i$ of heat exchanger 271. Thus, pressurized fluid can reach the input port $271i$ of heat exchanger 271 by way of either valve $244_1$ or $244_2$, or by way of both if both valves are in the open state.

Just as pressurized fluid may be coupled to the input port $271i$ of heat exchanger 271 by either or both of two paths including paths 221 and 222, pressurized fluid may be coupled by either or both of two paths, including paths 221 and 222, to the input ports $261_1i$, $261_2i$, $262_1i$, $262_2i$ of heat exchangers $261_1$, $261_2$, $262_1$, and $262_2$, by opening valve 243 in conjunction with the opening of at least one of valves $243_1$ and $243_2$.

Unlike the arrangement of FIG. 1, the arrangement of FIG. 2 includes valves in the drain paths. Valves in the drain paths may be desirable to prevent backflow and to allow maintenance on or replacement of particular units. The main drain paths are designated $221_1$ and $222_1$ in FIG. 2. Drain paths $221_1$ and $222_1$ join at a tee or bifurcation 31, and the common port of the tee is coupled to drain 9. Fluid having passed through heat exchanger 271 exits by way of port $271o$ and arrives at tee or bifurcation $231_5$. If valve $248_4$ is open, the fluid from output port $271o$ flows from tee or bifurcation $231_5$ to drain path $221_1$ and thence to drain 9. On the other hand, if valve $248_5$ is open, the fluid from output port $271o$ flows from tee or bifurcation $231_5$ to drain path $222_1$ and thence to drain 9. If both valves $248_4$ and $248_5$ are open, fluid can flow from drain port $271o$ to drain 9 by way of two paths.

Similarly, there are multiple paths for the flow of fluid from the drain ports $261_1o$, $261_2o$, $262_1o$, $262_2o$ of heat exchangers $261_1$, $261_2$, $262_1$, and $262_2$, respectively, to drain 9. Opening valve $248_2$ allows drain fluid to flow from tee or bifurcation $231_1$ to drain 9 by way of path $221_1$, and opening valve $248_3$ allows drain fluid to flow from tee or bifurcation $231_2$ to drain 9 by way of path $222_1$. Opening valve $248_1$ allows drain fluid to flow between tees or bifurcations $231_1$ and $231_2$, thus allowing drain fluid from heat exchanger drain ports $261_1o$, $261_2o$, $262_1o$, $262_2o$ of heat exchangers $261_1$, $261_2$, $262_1$, and $262_2$, respectively, to flow by that one of paths $221_1$ or $222_1$, or both, as permitted by the states of valves $248_2$ and $248_3$. As in the case of the arrangement of FIG. 1, a network 70 interconnects the various valve controllers, flow valves, and pump controllers so that information relating to the valve states and flow rates may be received by each of the valve and pump controllers.

Figure 3:
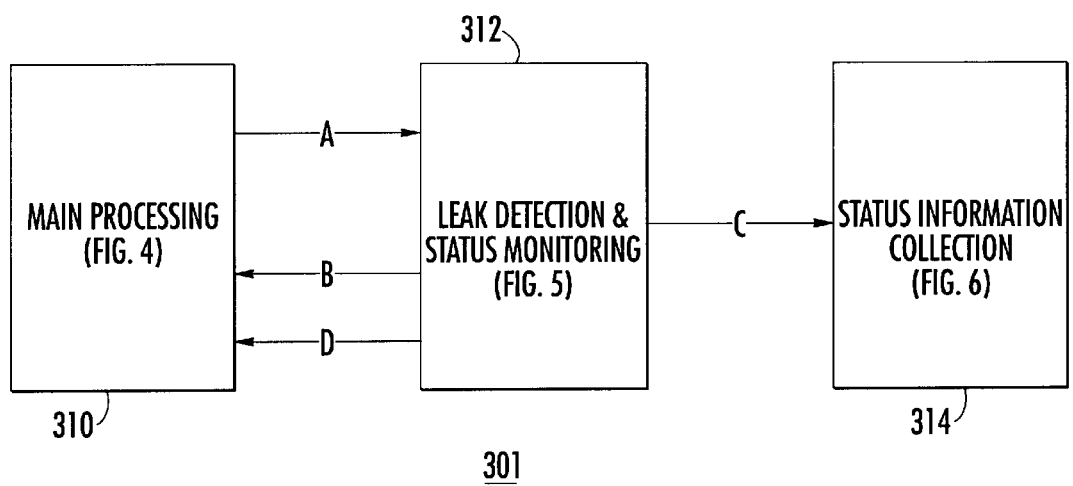
FIG. 3 is a simplified block representation of various software or logic portions which are associated with each valve of the arrangement of FIGS. 1 or 2 for autonomously controlling the valve.

FIG. 3 is a highly simplified block diagram representing a portion 301 of the software which resides at, or is associated with, each valve controller of the arrangements of FIGS. 1 and 2. In addition to the illustrated software, each valve will have resident or associated equipment and software (not illustrated) for communicating over the network 70 of FIGS. 1 and 2, and valve operating equipment (not illustrated) for actually controlling the state of the fluid valve. The valve operating equipment may include electrically, pneumatically, andor hydraulically-powered motors or drivers. Some valves might even be powered by stored mechanical energy, as for example by a wind-up spring or a weight-and-pulley arrangement.

Software block 310 of software 301 of FIG. 3 represents the main processing flow for determining or commanding the state of the associated valve. Block 310 receives information from an ancillary processing block 312 by way of paths designated B and D. Block 310 produces commands which proceed by way of a path designated A to a leak detection and status monitoring block 312. Block 314 represents a logic arrangement for collecting status information from flow meters, pressure sensors and valve state establishing the times at which various calculations are performed. The timing of the calculations is important, because the information on which the calculations are based may have been sensed at different times, thereby tending to reduce the relationship among different quantities. For example, if the flow through a flow sensor of FIG. 1 is measured or sensed to be zero at time t1, and the pressure in the associated pipe is measured to be low at a later time, the calculation may lead to the erroneous conclusion that the pump is not pumping hard enough, when simultaneous measurements might reveal that the pipe pressure is low, but also that there is a large fluid flow through the sensor. Such a condition might lead to a correct conclusion (for some situations) that there is a break in the pipe downstream from the sensor. The timing provided by block 314 of FIG. 3 aligns the measurement times so the calculations are meaningful.

Figure 4:
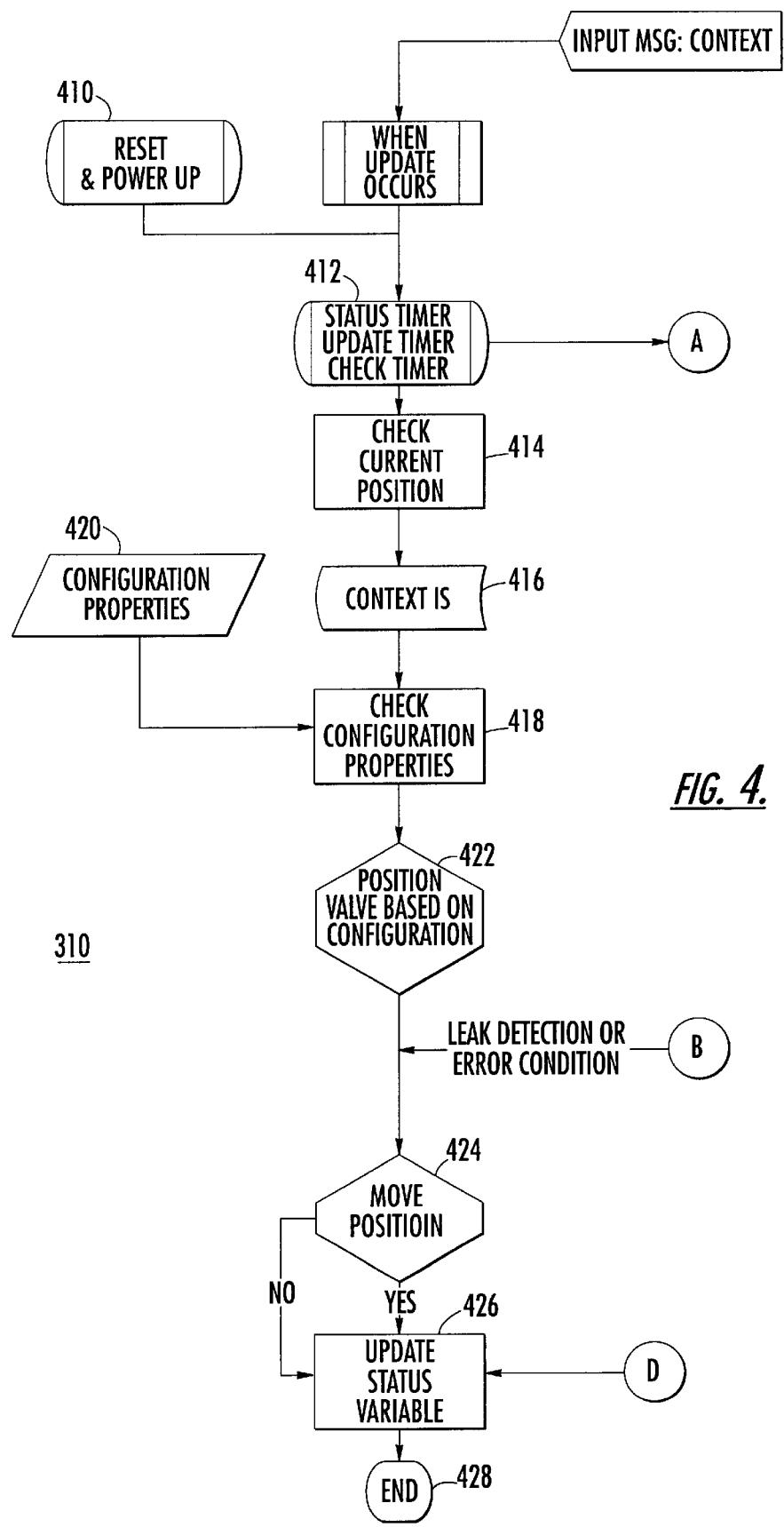
FIG. 4 is a simplified block representation of a logic flow chart or diagram of a portion of FIG. 3.

FIG. 4 is a simplified flow chart or diagram illustrating the main logic sequence of block 310 of FIG. 3. In FIG. 4, the logic can be viewed as starting at a block 410, representing power-up or reset. The logic traverses various logic paths continuously in normal operation. From block 410, the logic flows to a block 412, which represents resetting of the system timers. The default values of the software are used to set the correct initial position of the valve. With the system timers reset, the logic branches over path or node A to leak detection and status monitoring block 312 of FIG. 3. From block 412, the logic flows to a block 414, which represents determination of the current state or position of the associated valve as being nominally open (fluid flow permitted), closed (no fluid flow) or (in some embodiments) at positions between open and closed. From block 414, the logic of FIG. 4 flows to a block 416. Block 416 receives information relating to the system context from network 70 of FIGS. 1 and 2. The system context information tells the valve the conditions under which the ship is operating, which may include such conditions as "docked," "normal," and "battle." This is merely a memory store which stores information from a remote source for use by the logic flow. From block 416, the logic flows to block 418, which combines the information from block 416 with information telling the valve "where it is" in the context of the system, so that the autonomous logic of FIG. 4 for each valve can interact, by way of the network, with sensors and with other valves of the system in a quasi-intelligent manner to achieve the desired result. The system configuration information is maintained in a memory designated 420. The system configuration information is a setting for each valve which describes it in functional terms, such as a "root" valve, which allows flow or a cross-connect valve, which allows selection from among multiple paths. In general, the location or system configuration information contained in block 420 does not change from time to time, as the valve ordinarily stays in the same location in the same plumbing system. The only situations in which the memorized configuration information might be changed include in conjunction with reconfiguration of the plumbing system or removal of a valve (with its software) to another location in the same or a different plumbing system.

From block 418 of FIG. 4, the logic flows to a driver block 422, which represents the setting of the associated valve to the position determined in block 418.

From block 422 of FIG. 4, the logic proceeds to a decision block 424. Block 424 responds to the command from driver block 422 or to the leak- or error-condition command from node B, generated in the logic flow of FIG. 5. Block 424 of FIG. 4 compares the commanded state of the valve with the current valve position. If no change in the position of the valve is required in order to meet the commanded position, the logic leaves decision block 424 by the NO output, and arrives at a block 426. If a change in position of the valve is required, the logic leaves decision block 424 by the YES output and effects the position change, and the logic then arrives at block 426. Block 424 must resolve conflicting valve state commands in some cases. For example, if the normal configuration command is produced by block 422 and a "close valve" command is received by way of node B, block 424 uses logic which may be dependent upon the configuration properties to resolve the conflict. Ordinarily, the emergency-condition command arriving by way of node B will override the normal-mode commands from block 422.

Block 426 of FIG. 4 updates the valve-position variable, and makes it available to other controllable valves of the system by way of the interconnecting network 70 of FIGS. 1 and 2. From block 426, the logic flows to an END or Pause block 428, in which the logic resides until the next logic cycle is initiated.

Figure 5:
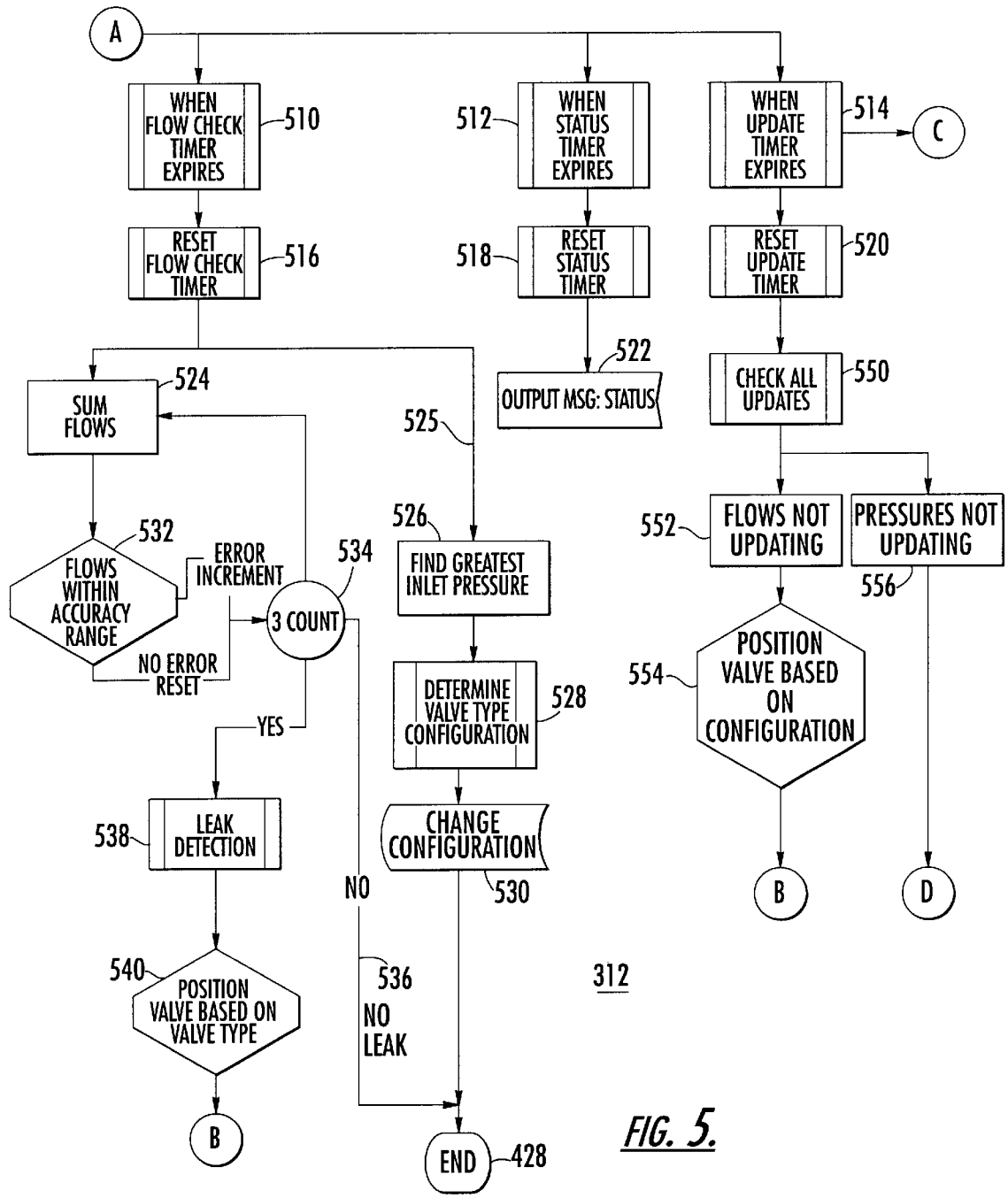
FIG. 5 is a simplified block representation of a logic flow chart or diagram of another portion of FIG. 3.

FIG. 5 is a simplified representation of the logic of block 312 of FIG. 3. In FIG. 5, the logic includes a plurality of timers which recurrently count down from some preset time, as for example 30 seconds. In FIG. 5, block 510 is a flow check timer, block 512 is a status reporting timer, and block 514 is a loss-of-communication timer which seeks input from the inter-valve network, and which deems the interconnection to the valve with which it is associated to be broken if no input is received within a particular interval.

Each of flow check timer 510, status reporting timer 512, and loss-of-communication timer 514 is connected to a timer reset block 516, 518, and 520, respectively. These timer reset blocks cause the associated counters to reset to their starting values upon occurrence of a complete count. Status reporting timer reset block 518 is connected to a block 522, which represents the sending or reporting from the associated controllable valve to the interconnection system 70 (FIGS. 1 and 2) of the current status or state of the valve, and of the flow through any associated flow meter. The reporting of such information from the associated valve to the network 70 is thus under the control of timer 512.

From timer reset block 516 of FIG. 5, the logic flows to a block 524 and by way of a path 525 to a block 526. Block 526 is the first block in a logic which determines flow direction through the associated valve. If the associated flow meter happens to be bidirectional, then the determination of the logic flow beginning at block 526 can be simplified to a mere decision block. If the associated flow meter is not bidirectional, block 526 represents determination of the relative pressures on each side of the associated valve, and determination of that one of the pressures which is greatest. Block 528 represents selection of the system configuration used in the associated valve based upon the flow direction. This is an either/or determination. From block 528, the logic flows to a block 530, which represents selecting the system configuration, selected from among the configurations stored in block 420 of FIG. 4. From block 530, the logic flows to end or pause block 428.

From timer reset block 516 of FIG. 5, the logic flow to block 524 begins leak or broken-pipe detection for the associated valve. Block 524 sums the fluid flows in the nearest neighbor of the system configuration stored in block 530 of FIG. 5. For example, if the associated valve of the logic of FIGS. 4 and happens to be valve $244_2$ of FIG. 2, then the configuration information or table stored in block 530 includes information to the effect that the input fluid flow of the associated valve $244_2$ equals the fluid flow through valve $241_2$, and the output fluid flow equals the sum of the fluid flows through valves $244_1$, $248_4$, and $248_5$. The assumption is made that the fluid flow through any valve is the same as that of the associated flow sensor, regardless of whether the flow sensor is integrated with the valve or whether it is a separate item located near the valve. Block 524 of FIG. 5 sums the flows, and the resulting sum should be in balance. The sum information from block 524 is evaluated by a decision block 532, which compares the imbalance with a tolerance which is determined by the tolerances in the flow measuring devices. Only those out-of-balance conditions which exceed the tolerances are deemed to be important. Since there may be transient imbalances, no single imbalance measurement is relied upon, but a sequence of plural imbalances are the criterion for declaring a leak or a break. For this purpose, the significant error conditions flowing from the ERROR output of block 532 are applied to an INCREMENT input port of an error counter 534, which increments. If decision block 532 detects a non-error condition during a clock cycle, the error counter 534 is reset to zero by a signal applied to the RESET input port. So long as a particular number of consecutive error conditions do not occur, error counter 534 produces no output on NO-LEAK logic path 536, and the logic flows to END or PAUSE block 428. Upon the occurrence of the selected number of errors, counter 534 produces a leak error signal and applies it to a block 538, which declares a leak. Block 540 represents the setting of the position of the associated valve to the position established by the configuration information for a leak condition. Most valves would be set to the closed state in the event of a leak, but there may be unusual circumstances in which the valve is not closed, but the leak is reported. From block 540, the logic flows to logic node B.

From update timer reset block 520 of FIG. 5, the logic flows to a block 550, which represents the determination of the existence of update signals from the neighbors during the update interval. Thus, if the associated valve is valve $244_2$, and its neighbors are $242_2$, $244_1$, $248_4$, and $248_5$, block 550 determines that signals have arrived from these four neighbors. Block 552 determines if the fluid flow information is not being updated, and generates logic signals which are passed to a block 554. Block 554 represents the setting of the associated valve to the position based on the configuration (which depends upon the operating mode). From block 554, the logic flows to node B, which returns to block 424 of FIG. 4. If pressure information from the neighbors is not being updated, block 556 responds, and the logic flows back to block 426 of FIG. 4 by way of node D.

Figure 6:
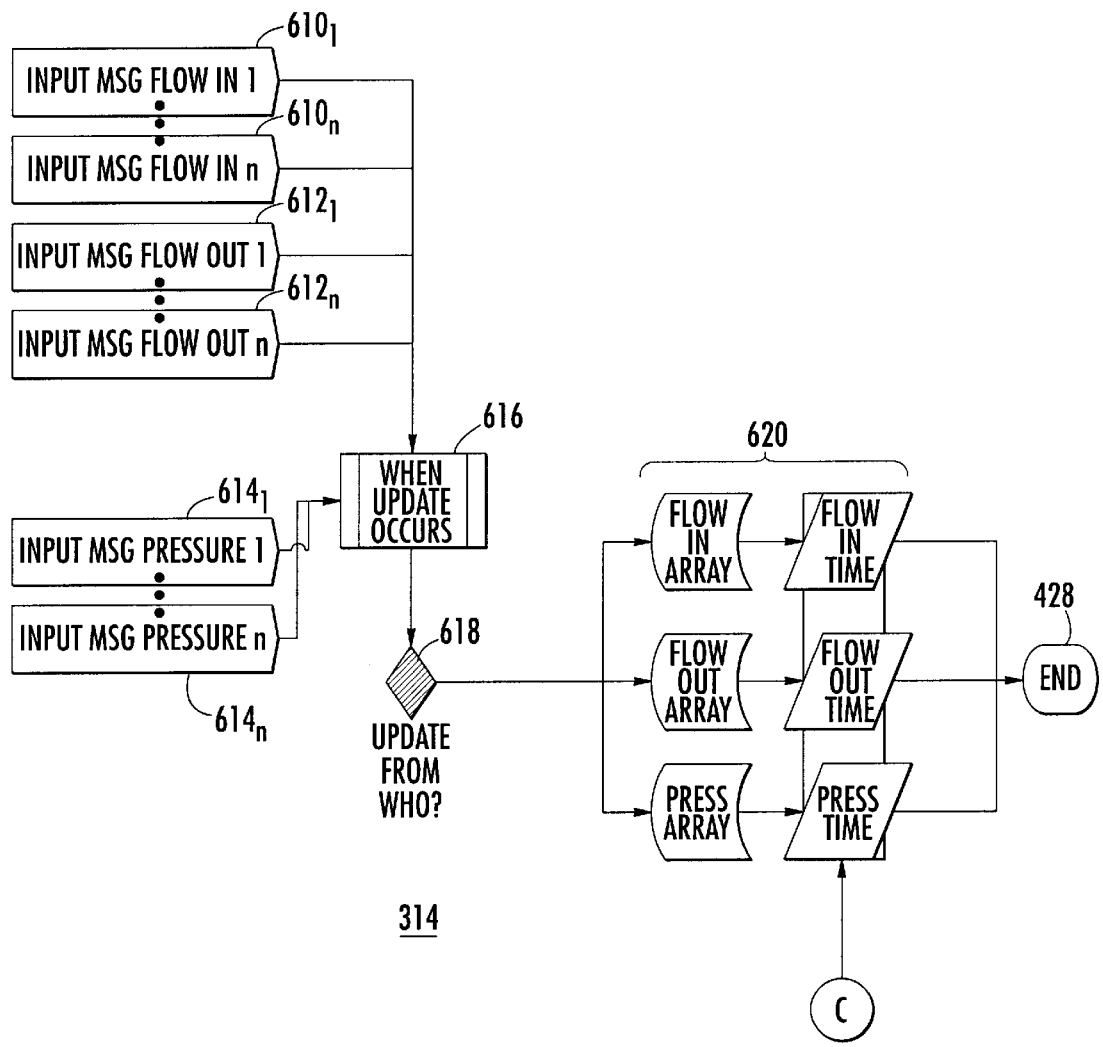
FIG. 6 is a simplified block representation of a logic flow chart or diagram of another portion of FIG. 3.

Status information collection block 314 of FIG. 6 collects information which arrives from mutually unsynchronized controllable valves. The information is captured, and temporarily stored in memory until it is needed by other portions of the logic. In FIG. 6, blocks $610_1$ . . . $610_1$ represent input messages occurring at different times, arriving by way of the network from neighbor flow meters associated with flow paths which provide fluid flow to the associated valve, blocks $612_1$ . . . $612n$ represent input messages occurring at different times, arriving by way of the network from neighbor flow meters associated with output fluid flows, and blocks $614_1$ . . . $614n$ represent messages occurring at different times, arriving by way of the network from neighbor pressure meters. All of the messages arrive at a block 616, which represents storage of the messages at the times at which they arrive, together with a message header indicating the source of the information and the time of arrival. Block 618 distributes the information to the appropriate locations in an array 620 which facilitates processing for leak detection. Array 620 includes locations for each element of flow-in information, together with time of arrival, locations for each element of flow-out information, together with time of arrival, and locations for each element of pressure information, together with time of arrival. The array information is made available to other portions of the logic, under command by way of node C from the update timer 514 of FIG. 5. From the array 620 of FIG. 6, the logic flows to END or PAUSE block 428.

An embodiment of a system of independently- or autonomously-controllable valves substantially in accordance with the above description was produced and tested in conjunction with flow systems more complex than those of FIGS. 1 and 2, and was found to operate satisfactorily. One insight which was derived experimentally was that a flow sensor is desirably associated with each of the controllable valves. It was found that systems containing fewer flow determinations than valves were difficult to stabilize under some conditions. It is believed that the use of more accurate flow sensors might allow adequate system stability with fewer flow sensors than controllable valves.

Figure 7:
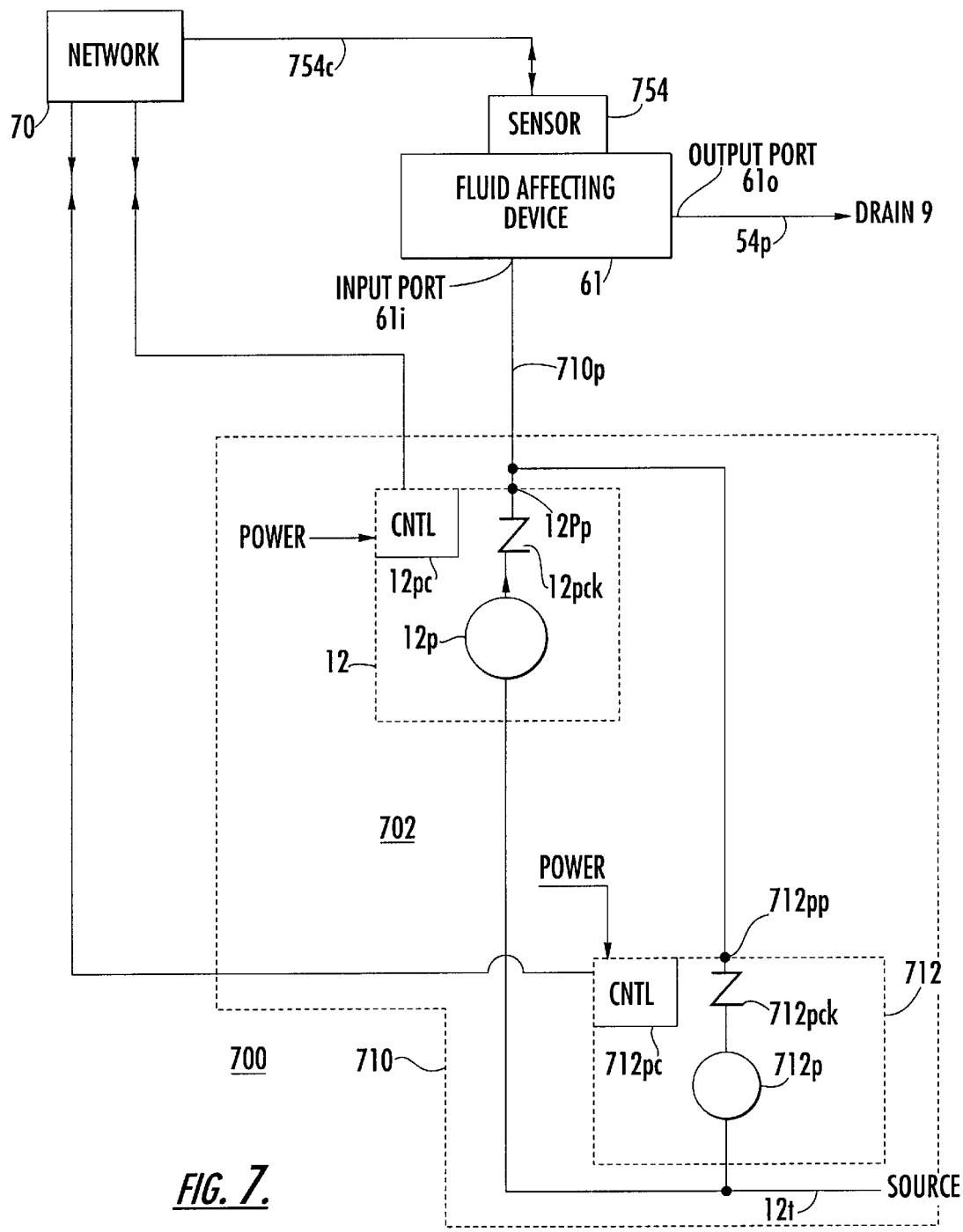
FIG. 7 is a simplified block diagram of an arrangement according to an aspect of the invention, in which a pair of controllable pumps supply fluid to a fluid affecting device.

In FIG. 7, a fluid circulation system 700 includes a fluid affecting device, which is illustrated as a block 61, corresponding to a heat exchanger of FIG. 1, but which may be any other device which uses fluid and has some effect on the fluid. The fluid affecting device 61 of FIG. 7 has a fluid input port 61i and a fluid output port 61o coupled by way of a pipe 54p to a drain 9. A sensor 754 is associated with fluid affecting device 61. Sensor 754 may be a pressure sensor coupled to sense the fluid pressure at the input or output port of the fluid affecting device 61, or it may be a flow sensor coupled for sensing the flow through the fluid affecting device. Sensor 754 is coupled by a communication path 754c to communication network 70.

A source 710 of pressurized fluid in FIG. 7 provides pressurized fluid by way of a pipe 710p to fluid input port 61i of fluid affecting device 61. Source 710 includes a set 702 of pumps including a first controllable pump 12 and a second controllable pump 712. Pump 12 includes the actual pump (motor and impeller, for example) 12p, and also includes a check valve 12pck for reducing backflow of fluid into pump 12 pressure port 12$p_p$ if pump 12p is of a type, such as a centrifugal type, which allows such flow when deenergized. Check valve 12pck may be dispensed with if the pump 12p is of a type, such as a positive-displacement type, which does not allow back flow when inoperative. Pump 12 also includes a controller (CNTL) 12pc, which is connected to a power source, and is also connected to network 70. Controller 12pc includes an independent program (hardware, software, or firmware) which senses the condition of the pump 12, and reports the condition to the network 70, and also includes control portions, described below, so that (a) if the sensed parameter is such as to require fluid flow, determining if that one of the first and second pumps with which it is not associated is pumping, and (b) energizing the associated pump if the sensed parameter is such as to require fluid flow and that one of the pumps with which it is not associated is not pumping. Put another way, the program associated with pump 12 determines from information received from the network 70: (a) if sensor 754 is calling for fluid, (b) if pump 712 is operating or pumping, and then starts pump 12p if pump 712 is not pumping.

Similarly, source 710 of FIG. 7 includes a second pump 712. Pump 712 of FIG. 7 includes the actual pump 712p, and also includes a check valve 712pck, if necessary, coupled between pump 712p and pressure port 712pp of pump 712. Pump 712 also includes a controller (CNTL) 712pc, which is connected to a power source, and is also connected to network 70. Controller 712pc includes an independent program which senses the condition of the pump 712, and reports the condition to the network 70, and also includes control portions, described below, so that (a) if the sensed parameter is such as to require fluid flow, determining if that one of the first and second pumps with which it is not associated (that is, pump 12) is pumping, and (b) energizing the associated pump (that is, pump 712) if the sensed parameter is such as to require fluid flow and that one of the pumps with which it is not associated (pump 12) is not pumping. Put another way, the program associated with pump 712 determines from information received from the network 70 if sensor 754 is calling for fluid, determines if pump 12 is operating or pumping, and starts pump 712p if pump 12 is not pumping. Thus, two substantially identical pumps, each having an independent program associated with it, co-act in an "intelligent" manner to assure a supply of fluid to the using device when the using device calls for fluid. Damage to, or destruction of, one of the two pumps does not, in principle, prevent the other from operating, thus achieving substantial redundancy and consequent reliability. Similarly, a break in the communication path between the network and one of the pumps will be treated as a failure of the pump so disconnected.

Figure 8:
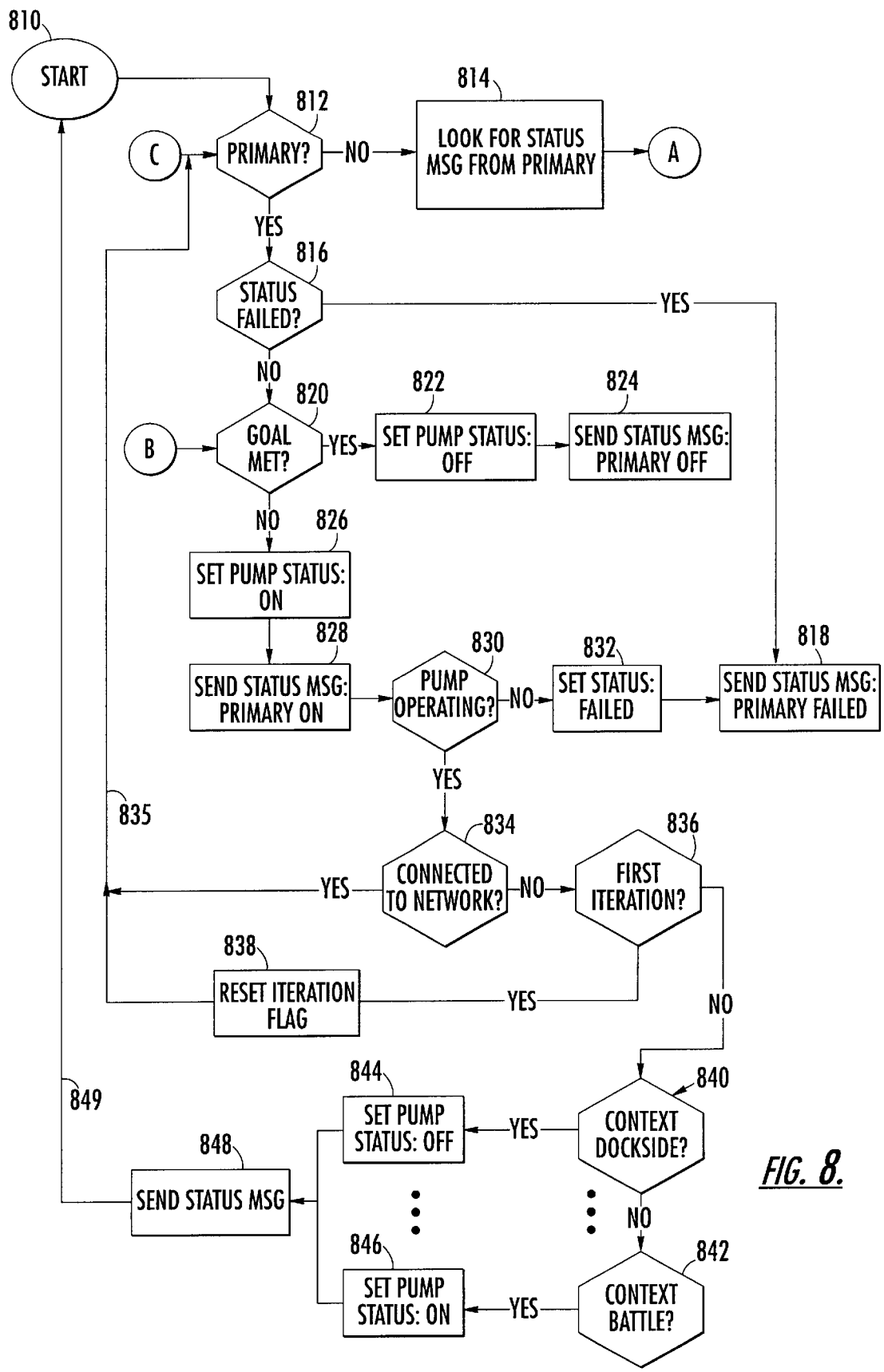
FIGS. 8 and 9 together constitute a simplified flow chart or diagram of the independent logic associated with each pump of a fluid system.

FIG. 8 is an overall flow chart or diagram of the software associated with each of the pumps 12 and 712 of FIG. 7. In FIG. 8, the logic starts at a start block 810, and proceeds to a decision block 812. Decision block 812 looks to an internal memory, which is preferably of a nonvolatile type, to determine if the associated pump is deemed to be a primary pump or a secondary pump. This is initial information which may be preloaded into the memory for each pump in the fluid system. If the associated pump is deemed to be secondary, the logic flows from the NO output of decision block 812 to a further block 814, which represents waiting or looking for a status message from the primary pump. From block 814, the logic flows to a logic node A. If the associated pump is deemed to be primary, the logic leaves decision block 812 by the YES output, and proceeds to a further decision block 816, which represents a determination as to whether the primary pump status as recorded in internal memory is "FAILED." If the status is FAILED, the logic leaves decision block 816 by the YES output, and proceeds directly to a block 818, which represents immediate transmission over the network of the message "PRIMARY FAILED." If the memorized recorded status is not FAILED, the logic leaves decision block 816 by the NO output, and proceeds to a decision block 820. Decision block 820 determines if the system goal is met or satisfied. In the context of a heat exchanger as the fluid using or affecting device, the goal may be, for example, the existence of a minimum fluid flow at either port of the fluid affecting device, or a temperature below a given threshold value, which in turn might be dependent upon a fluid flow rate. If the goal has been or is currently met, the logic leaves decision block 820 by the YES output, and proceeds to a block 822. Block 822 represents the setting of the status of the associated pump to OFF, which is accomplished by deenergizing the pump. This makes sense, as the primary pump should not be operating if there is no demand for fluid. From block 822, the logic proceeds to a block 824, which represents the sending of a status message PRIMARY OFF over the network. The logic will traverse decision blocks 816 and 820, and blocks 822 and 824, during each iteration through the logic of FIG. 8, so long as the pump is primary and the status is NOT FAILED. It would also be possible to put these blocks into a separate logic loop, independent of the remainder of the logic, to provide a continuous monitoring of the status of the pump.

In FIG. 8, the logic leaves decision block 820 by the NO output if the goal has not been met (that is, if there is fluid flow or pressure demand), and the logic then arrives at a block 826. Block 826 represents the setting of the associated pump status to ON, which means simply applying power to the motor of the associated pump. This makes sense, as the primary pump should be in operation if the demand has not been met. Block 828 represents the sending of the message PRIMARY ON over the network to the other equipments, including the other (secondary) pumps.

Once the primary pump is in operation, the logic of FIG. 8 flows from the block 828 to a decision block 830. Decision block 830 determines the actual operation status of the associated pump. While the pump should be in operation if energized as commanded by block 826, it might have open windings, a seized bearing, or other malfunction which results in no actual pumping of fluid. The fact of operation can be readily determined by an output flow sensor or pressure sensor, or both. These may be integrated into the associated pump, so that the network is not needed to communicate with the sensors, or they may be separate units which communicate with the associated pump controller by way of the network 70. If the associated pump is not confirmed to be operating by such conventional decision-making, the logic leaves decision block 830 by the NO output, and flows to a block 832. Block 832 represents the setting of the status of the associated memory to FAILED, and the logic then reaches block 818, which sends the status message PRIMARY FAILED. There are several ways to handle the logic after block 818. One way is to shut down the pump controller logic except for those portions providing responses to inquiries. When the device is repaired, the status flag would have to be re-set to NOT FAILED, and pump could then be returned to the pool of secondary pumps.

If the associated pump is determined to be pumping in response to the conventional tests in FIG. 8, the logic leaves decision block 830 by the YES output. From the YES output of decision block 830, the logic arrives at a decision block 834. Block 834 determines if the associated pump and program are connected to the network. This determination is made by simple techniques such as deeming the status to be CONNECTED if signals are received at the network input port of the processor running the program of FIG. 8. More sophisticated techniques may be used, such as sending messages to other units of the network requesting replies. If block 834 determines that the pump and program are connected to the network, the logic leaves by the YES output, and returns by way of a path 835 to decision block 812. On the other hand, if decision block 834 determines that connection to the network has been lost or at least is not established to be present, the logic leaves decision block 834 by the NO output. The lack of signals at the network port does not necessarily indicate that the network is not connected, as signals may not be received during the first iteration of the logic of the program of FIG. 8, since all other devices may be in a start-up phase of operation and not sending signals. Thus, the program of FIG. 8 must operate somewhat differently during the initial or start-up phase of operation. From the NO output of decision block 834, the logic flows to a decision block 836. Block 836 determines if the current iteration is the first iteration, accomplished in well-known manner by examining the setting of an initial flag. If the current iteration is the first iteration, the logic leaves decision block 836 by the YES output, and proceeds by way of a flag-resetting block 838 and by path 835 back to decision block 812. On the other hand, if the current iteration is the second or later iteration, the logic leaves decision block 836 by the NO output, and arrives at a decision block 840. Decision blocks 840 . . . 842 together represent evaluation of the last-known context in which the system as a whole was operating. For example, if network communications are lost during a time at which the ship is at dockside during peacetime, it may not make sense to do anything at all to the associated pump during loss of communication. The state or context is determined by an examination of a context memory (not explicitly illustrated) by decision block 840. If the status is found to be peacetime dockside, decision block 840 routes the logic by way of its YES output to a block 844, representing setting the status of the associated pump to OFF if it is not already off. Such an action may prevent flooding by comparison with a situation in which fluid flow support is provided for a system (the context being peacetime and dockside) which is not energized. If the context is other than peacetime dockside, other decision blocks (not illustrated) may result in other actions. The last decision block in the string, namely decision block 842, represents a last known context of BATTLE. In the event that the logic reaches decision block 842 under a BATTLE condition, the logic is routed to its YES output and to a block 846. Block 846 may represent, for example, the turning ON of the associated pump on the assumption that battle-critical equipment requires the resource, even though communication with the network has been lost. From either of blocks 844, 846, or any other like block, the logic flows to a block 848, representing the (possibly only attempted) sending of status message over the network. The logic then returns to block 810 by way of a return logic path 849.

Figure 9:
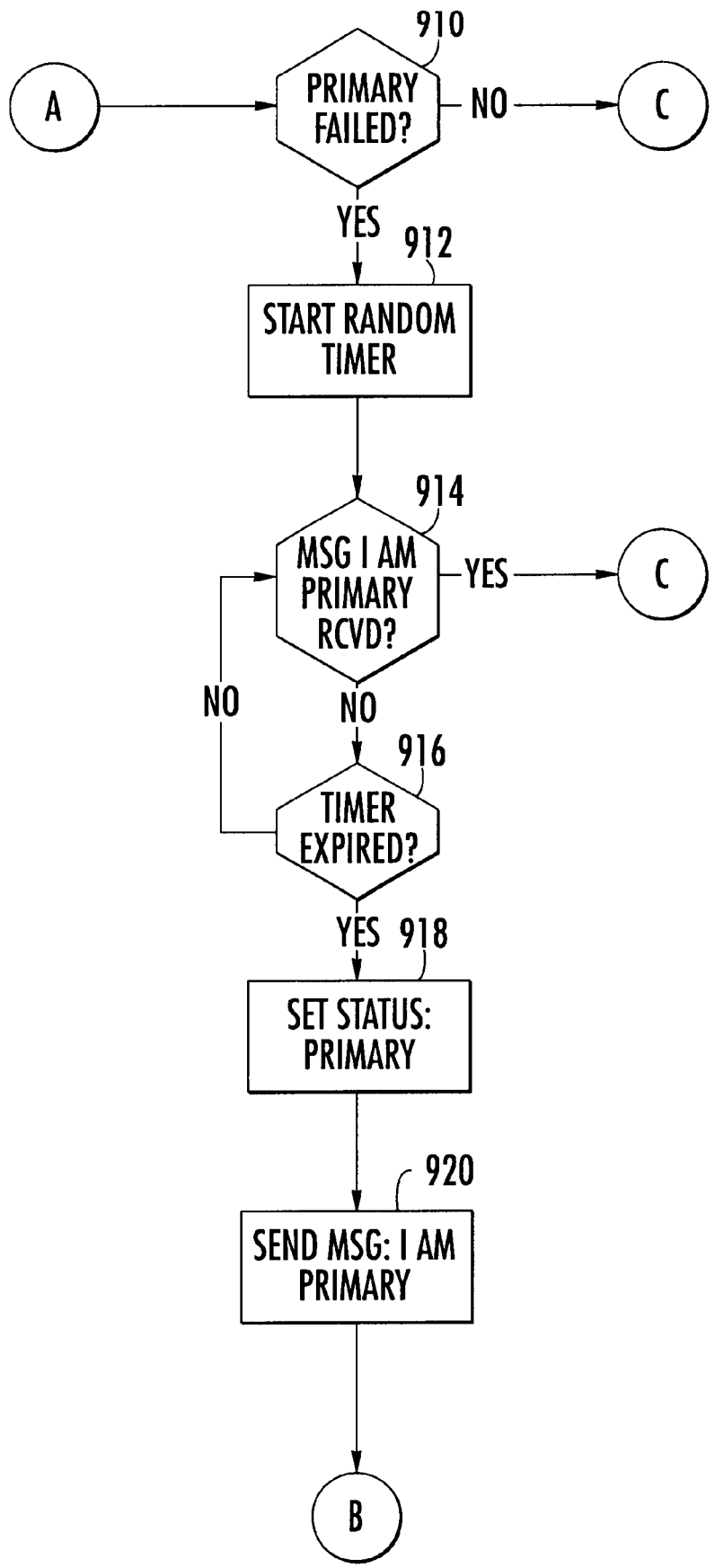

FIG. 9 represents another portion of the logic or a continuation of the logic of FIG. 8, and thus both the logic flows of FIGS. 8 and 9 operate in conjunction with just one associated pump. As described above, the logic associated with FIG. 8 reaches node A at startup if the associated pump is not deemed to be the primary pump. The logic flow enters the flow diagram of FIG. 9 from node A, representing the beginning of the logic flow for a secondary pump, which is to say a pump in which the internal memory of the associated controller or program deems it to be secondary (or at least not-primary). From node A of FIG. 9, the logic proceeds to decision block 910. Decision block 910 determines if a PRIMARY FAILED message has been received. This is performed by simply placing such a message into memory when it is received, and retrieving the message from memory, if it is present, in response to arrival of the logic at decision block 910. If the primary pump is not failed as indicated by a lack of a PRIMARY FAILED message, the logic leaves decision block 910 by way of the NO output, and returns by way of a node C to block 812 of FIG. 8. On the other hand, if the primary pump is reported as having failed, the logic leaves decision block 910 by the YES output, and the logic flows to a block 912. Block 912 represents the starting of a random-interval timer. The purpose of the random timer is to distinguish among the many currently-secondary pump/program combinations which might potentially assume primary status if the primary pump has failed. In order to prevent all of the potential secondary pumps from attempting to become primary, only that one of the secondary pumps in which the count of the random timer first expires or reaches zero is allowed to become primary. This is accomplished by the logic of decision blocks 914 and 916. More particularly, During the interval in which counter 912 is counting down, decision block 914 looks for an "I AM PRIMARY" message from the network. If such a message is received before the expiry of the count of counter 912, this means that some other pump in the fluid system has assumed primary status, and the pump associated with this version of the logic need not assume such status. The logic leaves decision block 914 by the YES output in such a situation, and proceeds to node C. By returning to node C and returning to decision block 812 of FIG. 8, the associated pump remains in the "SECONDARY" state or condition. On the other hand, if no "I AM PRIMARY" message is received before the expiry of the count of the counter 912, the logic leaves decision block 914 by the NO output, and proceeds to decision block 916. From decision block 916, the logic flows to block 918, which deems the associated pump to be primary, and sets the associated status in local memory to PRIMARY. From block 918, the logic flows to a block 920, which sends an I AM PRIMARY message over the network, to thereby maintain all the other secondary-status pumps in secondary state. From block 920, the logic returns by way of node B to decision block 820 of FIG. 8.

In the context of the fluid system of FIG. 7, there is but a single secondary pump, and the logic must flow to block 918, as the lack of other secondary pumps means that there will never be another message I AM PRIMARY before the expiry of the count of counter 912. Thus, the random-number scheme of FIG. 9 is not particularly useful where there is but a single secondary pump.

Figure 10:
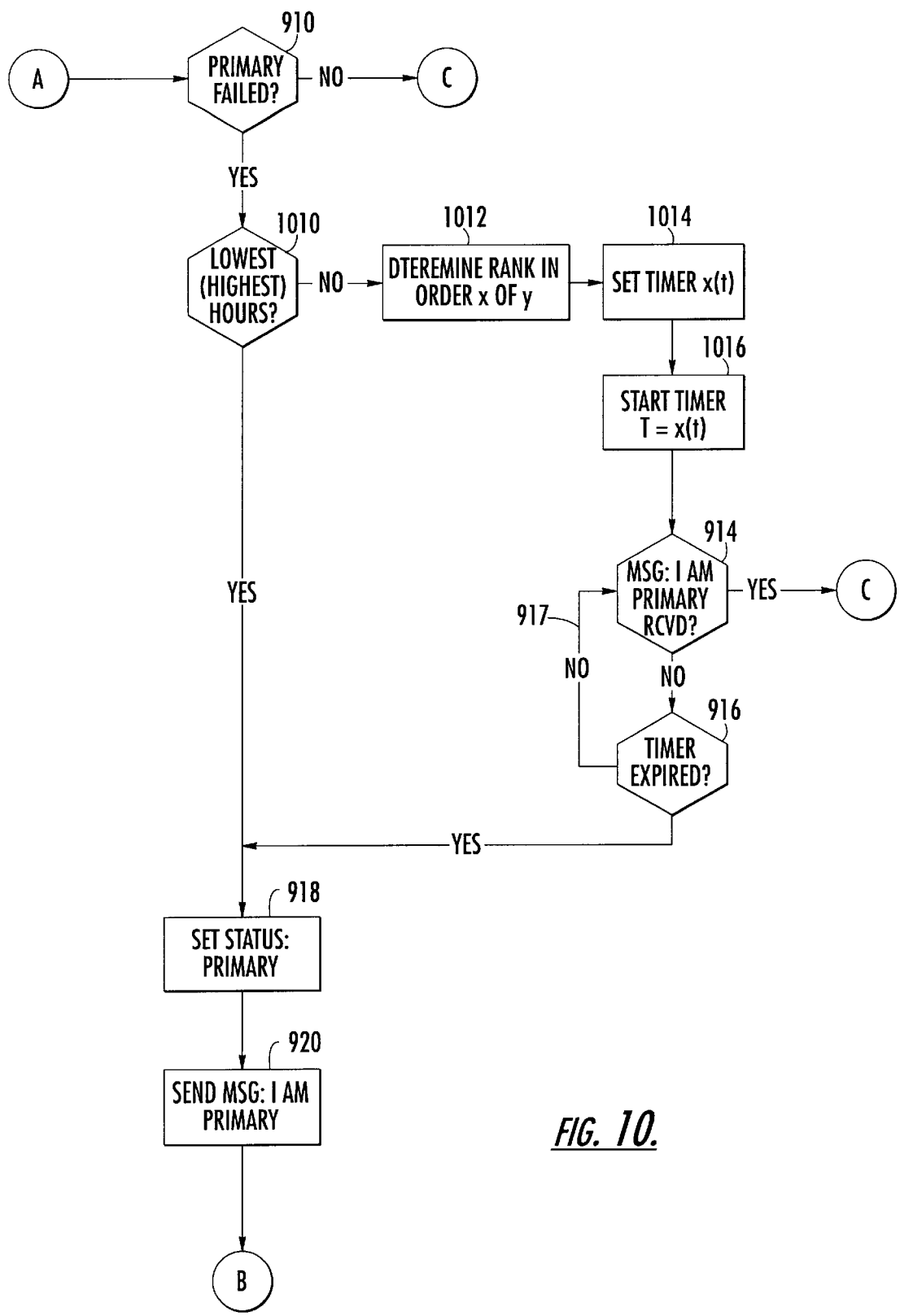
FIG. 10 is a simplified flow chart or diagram of logic which may be substituted for the logic of FIG. 9 for providing an alternative means for selecting among the secondary pumps.

It should be noted that the random-interval scheme of FIG. 9 for selection of the next pump to be the new primary pump is not necessary to the invention, it is merely one possible nicety. Other schemes could be used to select that one of the secondary pumps to be the new primary pump if the primary pump fails, and one of the criteria might be selection of the most-used pump, or the least-used pump, based upon historical records of time in actual pumping service. FIG. 10 is an alternative logic flow which can replace that of FIG. 9.

In FIG. 10, the logic arrives from node A at decision block 910, which performs the same function as in FIG. 9. If the primary is not failed, the logic leaves decision block 910 by the NO path, and proceeds to node C, as described in conjunction with FIG. 9. If the primary pump is failed, the logic leaves decision block 910 by the YES output, and arrives at a further decision block 1010, which determines if the associated pump is the one with the lowest (or highest) number of hours. This is accomplished by simply ranking the stored hours of the various pumps in ascending or descending order. If the associated pump is the highest- or lowest-ranked, the logic leaves decision block 1010 by the YES output, and proceeds to blocks 918 and 920, corresponding to those of FIG. 9, and thence to node B, having declared the associated pump to be primary. If the associated pump is not the highest-ranked, some other pump is highest-ranked, and should send its own I AM PRIMARY message. It could happen that the next-ranked pump could be totally destroyed, which could result in the logic waiting for the occurrence of an I AM PRIMARY message which would never arrive. If decision block 1010 finds that the associated pump is not the highest- or lowest-ranked, the logic leaves by the NO output, and arrives at a block 1012, which determines the rank (x) of the associated pump among all the other available secondary pumps (Y). This establishes how many potential secondary pumps would sequentially attempt to become primary before the current one should assert itself as primary. For this purpose, an internal timer 1014 is set to a time interval x(t), where t is some interval deemed to be sufficient for a secondary pump to assert its primary nature. Thus, if the associated pump were the third-ranked of four secondary pumps, the time interval set on the associated timer would be 3t, where t might be 1 millisecond. From block 1014, the logic then proceeds to a block 1016, which starts the timer. At the expiry of the time period, the logic enters logic including decision blocks 914 and 916, which coact by means of a path 917 as described in conjunction with FIG. 9, to route the logic to node C if a I AM PRIMARY message is received before the expiry of the timer count, and to route the logic to blocks 918 and 919 if the count expires before such a message is received. Thus, the various secondary pumps can sequentially attempt to assert themselves as primary if the current primary pump fails.

Other embodiments of the invention will be apparent to those skilled in the art, that, for example, the pumps need not be in the same housings as the flow meters, or may be in the same housings. The pressure meters may or may not be used, as desired. Various types of interconnecting networks may be used, including twisted-pair, cable, optical fiber, or even wireless. The particular implementation of the experimental units used copper twisted-pair wires running the LonWorks protocol. The particular logic processors were Neuron processors, a technology of Echelon Corporation of Palo Alto, Calif., but other processors may be used. While in the described embodiments the fluid affecting devices are heat exchangers, they could be chemical reaction devices, so long as the flow rates of the reactants and the reaction products are known and accounted for. While the network has been illustrated as a discrete block, those skilled in the art will recognize this as a mere convention to illustrate a distributed system without any central processing, at least as to pump control, although of course a shipboard communications network may be associated with, or "have" centralized control of many aspects of the ship's operation other than that of details of the operation of each individual pump. While all the descriptions are couched in terms of the pumps creating positive pressure at the fluid affecting device, those skilled in the art will recognize that negative pressure (partial vacuum) may also be used, whereupon the fluid flow is retrograde. While not specifically mentioned, the pumps may be single-stage or multiple-stage. While not explicitly mentioned, the pump controllers may change pump speed in a stepwise- or continuously-variable manner instead of simply energizing for full speed operation and de-energizing for zero speed. As a further alternative to selection of the secondary pump which is to become primary, the logic could be arranged to select a new primary pump when the current primary pump has run a predetermined number of hours, thus tending to equalize the usage among the available pumps.

Thus, an aspect of the invention lies in a fluid flow system (10, 210, 700) which tends to cause a flow of fluid through at least one fluid affecting device (61, 62; 261 . . . 271), which may be a heat exchanger which transfers heat to or from a fluid such as water, or which performs some other act on the fluid. The fluid flow is induced by a set (202; 702) including a plurality of pumps (12p, 212p1, 212p2; 12p, 712p), not all of which need be energized at a given time, and any one of which may fail. The system includes at least one fluid affecting device (61, 62; 261 . . . 271) including a first port (such as 61i) and a second port (such as 61o), which are connected by an internal path (not explicitly illustrated) for the flow of the fluid between the first (61i or other) and second (61o or other) ports. The system also includes a controllable first pump (12p, for example) which, when energized, produces pressurized fluid at a pressure port (12p$_p$), and which, when not energized, at least tends to impede the fluid flow (that is, reduce the magnitude of the flow below that which would occur with a pipe or casing of the same size or diameter under the same pressure) into the pressure port of the first pump as a result of application of pressurized fluid to the pressure port of the first pump (as by inherent design or by use of a check valve 12pck or equivalent). In the case of positive-displacement pumps (12p, 212p1, 212p2,; 12p, 712p) such as Roots-type pumps (12p, 212p1, 212p2,; 12p, 712p), the inherent design prevents retrograde fluid flow, and in the case of other pumps (12p, 212p1, 212p2,; 12p, 712p), such as centrifugal pumps (12p, 212p1, 212p2,; 12p, 712p), the pump may be associated with a check valve (12pck, 712pck) to prevent reverse flow. The system (10, 210, 700) also includes a controllable second pump (212p1 or 212p2 in the case of system 210 of FIG. 2, and 712p in the case of system 700 of FIG. 70) which, when energized, produces pressurized fluid at a pressure port, and which, when not energized, at least tends to impede the flow of fluid into the pressure port of the second pump as a result of application of pressurized fluid to the pressure port of the second pump. A sensing arrangement or means (754 in the case of system 700 of FIG. 7, and any of a plurality of equivalent sensors in system 210 of FIG. 2) is coupled to the fluid affecting device or devices (61, 62; 261 . . . 271) for generating a sensed signal representing a control parameter associated with one of flow of the fluid and pressure of the fluid; this may be, for example, a flow meter coupled for sensing the flow of fluid through the fluid affecting device (61, 62; 261 . . . 271), or a pressure sensor coupled to the high-pressure side of the fluid affecting device (61, 62; 261 . . . 271), or even to the low-pressure side for some applications. A communication network (70) interconnects the sensing arrangement or means (754 or equivalent) and the first and second pumps (12p, 212p1, 212p2,; 12p, 712p) for providing a path for the flow of information relating to the sensed signal and of at least the state of the first and second pumps (12p, 212p1, 212p2,; 12p, 712p). An independent first software program (FIGS. 8 and 9) is associated with the first pump. The first software program is preloaded with information as to the first pump identification number and its status as primary or secondary, and about the second pump and the fluid affecting device (61, 62; 261 . . . 271), for receiving information including the sensed signal and the state of the second pump, and for transmitting over the communication network signals representing the state of the first pump. Similarly, an independent second software program (Another copy or version of the software of FIGS. 8 and 9) is associated with the second pump. The second software program is preloaded with information about its own identification, and about the first pump and the fluid affecting device (61, 62; 261 . . . 271), and is arranged for receiving information including the sensed signal and information including the state of the first pump, and for transmitting over the communication network signals representing the state of the second pump. Each of the first and second independent software programs controls its associated pumps (12p, 212p1, 212p2,; 12p, 712p) so that (a) if the sensed parameter is such as to require fluid flow, a determination is made if the one of the first and second pumps (12p, 212p1, 212p2,; 12p, 712p) with which it is not associated is pumping, and (b) for energizing the associated one of the first and second pumps (12p, 212p1, 212p2,; 12p, 712p) if the sensed parameter is such as to require fluid flow and the one of the pumps (12p, 212p1, 212p2,; 12p, 712p) with which it is not associated is not pumping. In a particular embodiment of the invention, at least one of the independent programs is preloaded with information identifying one of the first and second pumps (12p, 212p1, 212p2,; 12p, 712p) as a preferred or default pump.

It should be understood that the only information about the other pumps which any particular pump requires is that necessary for receiving a network message from the other pumps. The only non-pump information which is necessary is the identity of the sensor(s) and possibly their parameters, and for the sending of status messages. In LonWorks, these items of information are called "network bindings" and are not a part of the code. In other processor schemes the information may be part of the code.

According to another aspect of the invention, a fluid flow system (210) tends to cause a flow of fluid through at least one fluid affecting device (261$_1$, 261$_2$, 262$_1$, 262$_2$, 271) of a set (1; 201) of fluid affecting devices (261$_1$, 261$_2$, 262$_1$, 262$_2$, 271), where any fluid affecting device (261$_1$, 261$_2$, 262$_1$, 262$_2$, 271) of the set (1, 201) of fluid affecting devices (261$_1$, 261$_2$, 262$_1$, 262$_2$, 271) may fail, where the flow of the fluid is induced by a plurality of pumps (12p, 212p$_1$, 212p2), any one of which may fail, the system comprising:

a first fluid affecting device (261$_1$, 261$_2$, 262$_1$, 262$_2$, 271), the first fluid affecting device (any one of 261$_1$, 261$_2$, 262$_1$, 262$_2$, 271), including a first port (such as 261$_1$i) and a second port (such as 261$_1$o) connected by a path for the flow of the fluid between the first and second ports;

a first pump (any one of 12p, 212p$_1$, 212p$_2$) for, when energized, producing pressurized fluid at a pressure port thereof, and for, when not energized, at least tending to impede the flow into the pressure port of the first pump as a result of application of pressurized fluid to the pressure port of the first pump;

a second pump (any other one of 12p, 212p$_1$, 212p$_2$) for, when energized, producing pressurized fluid at a pressure port thereof, and for, when not energized, at least tending to impede the flow into the pressure port of the second pump as a result of application of pressurized fluid to the pressure port of the second pump;

first sensing means (such as sensor 253$_1$) coupled to or associated with the first fluid affecting device (261$_1$, 261$_2$, 262$_1$, 262$_2$, 271), for generating a sensed signal representing a control parameter associated with one of flow of the fluid and pressure of the fluid;

a communication network (70) interconnecting the first sensing means and the first and second pumps, for providing a path for the flow of information relating to the sensed signal and of at least information relating to the states of the first and second pumps;

an independent first software program associated with the first pump and not with any other pump, the first software program being preloaded at least with information about the second pump and the fluid affecting means, for receiving information including the sensed signal and the state of the second pump, and for transmitting over the communication network signals representing the state of the first pump;

an independent second software program associated with the second pump and not with any other pump, the second software program being preloaded at least with information about the first pump and the fluid affecting means, for receiving information including the sensed signal and information including the state of the first pump, and for transmitting over the communication network signals representing the state of the second pump;

each of the first and second independent software programs controlling their associated pumps so that (a) if the sensed parameter is such as to require fluid flow, determining if the one of the first and second pumps with which it is not associated is pumping, and (b) energizing the associated one of the first and second pumps if the sensed parameter is such as to require fluid flow and the one of the pumps with which it is not associated is not pumping;

at least a second fluid affecting device (261$_1$, 261$_2$, 262$_1$, 262$_2$, 271), the second fluid affecting device (261$_1$, 261$_2$, 262$_1$, 262$_2$, 271), including a first port (such as 261$_1$i) and a second port (such as 261$_1$o) connected by a path for the flow of the fluid between the first and second ports;

a first fluid path (221) extending from a first fluid furcation (32) to the first port of the first fluid affecting device (261$_1$, 261$_2$, 262$_1$, 262$_2$, 271), of the set of fluid affecting devices (261$_1$, 261$_2$, 262$_1$, 262$_2$, 271), the first fluid path including a first software-controllable valve and a first flow sensor (223$_1$);

a second fluid path (222) extending from the first furcation (32) to the first port of a second fluid affecting device (any other one of 261$_1$, 261$_2$, 262$_1$, 262$_2$, 271), of the set (201) of fluid affecting devices (261$_1$, 261$_2$, 262$_1$, 262$_2$, 271), the second fluid path including a second software-controllable valve and a second flow sensor (223$_2$);

a third fluid path (223) extending from the first port of the first fluid affecting device (the one of $261_1$, $261_2$, $262_1$, $262_2$, 271), to the first port of the second fluid affecting device (the other one of $261_1$, $261_2$, $262_1$, $262_2$, 271), the third fluid path including a third software-controllable valve and a third flow sensor (243, 253);

a sink (9) for the fluid;

a second furcation (31) coupled to the sink;

a fourth flow sensor ($258_2$, for example) in a fourth fluid flow path ($249_2$) extending from the second port of the first fluid affecting device (one of $261_1$, $261_2$, $262_1$, $262_2$, 271), to the second furcation (31);

a fifth flow sensor ($258_3$, for example) in a fifth fluid flow path extending from the second port of the second fluid affecting device (another one of $261_1$, $261_2$, $262_1$, $262_2$, 271), to the second furcation (31);

a sixth fluid flow path (any one of 26, $226_1$, $226_2$) coupling the first furcation (32) to the pressure ports of the first and second pumps;

interconnections among the communication network (70) and at least some of the flow meters and valves for providing a path for the flow of information relating to the state of each valve and the flow rate sensed by each flow sensor;

an independent first software program associated with the first valve, the first software program being preloaded with information about the third and fourth fluid flow paths, for receiving from the network current fluid flow information associated with at least the third and fourth flow sensors, for summing the flows associated with the third and fourth fluid flow paths to thereby form a first summed fluid flow, and for comparing the first summed fluid flow with the flow through the first flow sensor, and for closing the first valve for closing off the first fluid flow path when the first summed flow is not equal to the flow through the first flow sensor;

an independent second software program associated with the second valve, the second software program being preloaded with information about the third and fifth fluid flow paths, for receiving from the network current fluid flow information associated with at least the third and fifth flow sensors, for summing the flows associated with the third and fifth flow paths to form a second summed fluid flow, and for comparing the second summed fluid flow with the flow through the second flow sensor, and for closing the second valve for closing off the second flow path when the second summed flow is not equal to the flow through the second flow sensor.

In a particular embodiment of this system, the fluid affecting devices ($261_1$, $261_2$, $262_1$, $262_2$, 271) include at least one heat exchanger.

What is claimed is:

1. A fluid flow system for tending to cause a flow of fluid through at least one fluid affecting device, where the flow is induced by a plurality of pumps, any one of which may fail, said system comprising:

at least one fluid affecting device, said fluid affecting device including a first port and a second port connected by a path for the flow of said fluid between said first and second ports;

a first pump for, when energized, producing pressurized fluid at a pressure port, and for, when not energized, at least tending to impede the flow into said pressure port of said first pump as a result of application of pressurized fluid to said pressure port of said first pump;

a second pump for, when energized, producing pressurized fluid at a pressure port, and for, when not energized, at least tending to impede the flow into said pressure port of said second pump as a result of application of pressurized fluid to said pressure port of said second pump;

sensing means coupled to or associated with said fluid affecting device, for generating a sensed signal representing a control parameter associated with one of flow of said fluid and pressure of said fluid;

a communication network interconnecting said sensing means and said first and second pumps, for providing a path for the flow of information relating to said sensed signal and of at least information relating to the states of said first and second pumps;

an independent first software program associated with said first pump and not with any other pump, said first software program being preloaded at least with information about said second pump, for receiving information including said sensed signal and said state of said second pump, and for transmitting over said communication network signals representing the state of said first pump;

an independent second software program associated with said second pump and not with any other pump, said second software program being preloaded at least with information about said first pump, for receiving information including said sensed signal and information including said state of said first pump, and for transmitting over said communication network signals representing the state of said second pump;

each of said first and second independent software programs controlling their associated pumps so that (a) if said sensed parameter is such as to require fluid flow, determining if the one of said first and second pumps with which it is not associated is pumping, and (b) energizing the associated one of said first and second pumps if said sensed parameter is such as to require fluid flow and said one of said pumps with which it is not associated is not pumping.

2. A system according to claim 1, wherein at least one of said independent programs is preloaded with information identifying one of said first and second pumps as a preferred or default pump.

3. A system according to claim 1, wherein at least one of said independent programs is not preloaded with information identifying itself as a preferred or default pump, and wherein said one of said independent programs includes a random timer for aiding in establishing whether said one of said independent programs is associated with a pump deemed to be primary.

4. A system according to claim 1, wherein at least one of said first and second pumps includes a serially coupled fluid valve, for reducing the flow of fluid into said pressure port of the associated valve when the associated one of said first and second pumps is deenergized.

5. A system according to claim 4, wherein said serially coupled fluid valve is a check valve.

6. An independent program for controlling a fluid pump in a system in which a plurality of such pumps are connected for supplying fluid under pressure to a utilization apparatus, and in which a communication network interconnects said pumps and said utilization apparatus, said program comprising:

a memory flag indicative of the primary or secondary status of that one of the pumps which is associated with the program;

a logic portion responsive to demand signals received from said utilization apparatus by way of said network, said logic portion examining said memory flag to determine said primary or secondary status for the associated pump, and for, if said status is primary, starting the associated pump in response to said demand signals.

7. An independent program for controlling according to claim 6, wherein said program further comprises:

a logic portion responsive to said memory flag, said logic portion monitoring the operative status of that one of said pumps having a primary status, said logic portion responding to a signal indicative of failure of said one of said pumps having a primary status by starting a random timer, and, in at least one mode of operation, deeming the associated pump to have said primary status if no signal deeming some other pump to be primary is received before expiry of a full count of said random timer.

8. An independent program for controlling according to claim 7, wherein, in a mode of operation other than said one mode of operation, said program further comprises means for determining if the associated pump is one of the highest- and lowest-ranked among all pumps deemed to be secondary, and if the determination of said determining means is that the associated pump is said one of said highest- and lowest-ranked pumps, deeming said associated pump to be primary.

9. A fluid flow system for tending to cause a flow of fluid through at least one fluid affecting device of a set of fluid affecting devices, where any fluid affecting device of said set of fluid affecting devices may fail, where the flow of said fluid is induced by a plurality of pumps, any one of which may fail, said system comprising:

a first fluid affecting device, said first fluid affecting device including a first port and a second port connected by a path for the flow of said fluid between said first and second ports;

a first pump for, when energized, producing pressurized fluid at a pressure port, and for, when not energized, at least tending to impede the flow into said pressure port of said first pump as a result of application of pressurized fluid to said pressure port of said first pump;

a second pump for, when energized, producing pressurized fluid at a pressure port, and for, when not energized, at least tending to impede the flow into said pressure port of said second pump as a result of application of pressurized fluid to said pressure port of said second pump;

first sensing means coupled to or associated with said first fluid affecting device, for generating a sensed signal representing a control parameter associated with one of flow of said fluid and pressure of said fluid;

a communication network interconnecting said first sensing means and said first and second pumps, for providing a path for the flow of information relating to said sensed signal and of at least information relating to the states of said first and second pumps;

an independent first software program associated with said first pump and not with any other pump, said first software program being preloaded at least with information about said second pump and said fluid affecting means, for receiving information including said sensed signal and said state of said second pump, and for transmitting over said communication network signals representing the state of said first pump;

an independent second software program associated with said second pump and not with any other pump, said second software program being preloaded at least with information about said first pump and said fluid affecting means, for receiving information including said sensed signal and information including said state of said first pump, and for transmitting over said communication network signals representing the state of said second pump;

each of said first and second independent software programs controlling their associated pumps so that (a) if said sensed parameter is such as to require fluid flow, determining if the one of said first and second pumps with which it is not associated is pumping, and (b) energizing the associated one of said first and second pumps if said sensed parameter is such as to require fluid flow and said one of said pumps with which it is not associated is not pumping;

at least a second fluid affecting device, said second fluid affecting device including a first port and a second port connected by a path for the flow of said fluid between said first and second ports;

a first fluid path extending from a first fluid furcation to said first port of said first fluid affecting device of said set of fluid affecting devices, said first fluid path including a first software-controllable valve and a first flow sensor;

a second fluid path extending from said first furcation to said first port of a second fluid affecting device of said set of fluid affecting devices, said second fluid path including a second software-controllable valve and a second flow sensor;

a third fluid path extending from said first port of said first fluid affecting device to said first port of said second fluid affecting device, said third fluid path including a third software-controllable valve and a third flow sensor;

a sink for said fluid;

a second furcation coupled to said sink;

a fourth flow sensor in a fourth fluid flow path extending from said second port of said first fluid affecting device to said second furcation;

a fifth flow sensor in a fifth fluid flow path extending from said second port of said second fluid affecting device to said second furcation;

a sixth fluid flow path coupling said first furcation to said pressure ports of said first and second pumps;

interconnections among said communication network and said flow meters and valves for providing a path for the flow of information relating to the state of each valve and the flow rate sensed by each flow sensor;

an independent first software program associated with said first valve, said first software program being preloaded with information about said third and fourth fluid flow paths, for receiving from said network current fluid flow information associated with at least said third and fourth flow sensors, for summing the flows associated with said third and fourth fluid flow paths to thereby form a first summed fluid flow, and for comparing said first summed fluid flow with the flow through said first flow sensor, and for closing said first valve for closing off said first fluid flow path when said first summed flow is not equal to said flow through said first flow sensor;

an independent second software program associated with said second valve, said second software program being preloaded with information about said third and fifth fluid flow paths, for receiving from said network current fluid flow information associated with at least said third and fifth flow sensors, for summing the flows associated with said third and fifth flow paths to form a second summed fluid flow, and for comparing said second summed fluid flow with the flow through said second flow sensor, and for closing said second valve for closing off said second flow path when said second summed flow is not equal to said flow through said second flow sensor.

10. A system according to claim 9, wherein said fluid affecting devices include at least one heat exchanger.

* * * * *